(12) United States Patent
Gretz (10) Patent No.: US 7,115,820 B1
(45) Date of Patent: Oct. 3, 2006

(54) RECESSED OUTLET BOX RETROFIT SIDING CONSTRUCTION

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/185,256

(22) Filed: Jul. 20, 2005

Related U.S. Application Data (63) Continuation-in-part of application No. 11/102,392, filed on Apr. 8, 2005, which is a continuation-in-part of application No. 11/070,344, filed on Mar. 2, 2005, which is a continuation-in-part of application No. 11/009,116, filed on Dec. 10, 2004, which is a continuation-in-part of application No. 10/863,942, filed on Jun. 9, 2004, now Pat. No. 6,956,171.

(51) Int. Cl.
*H02G 3/08* (2006.01)

(52) U.S. Cl. .......................... 174/481; 174/53; 174/57; 174/58; 220/3.2; 220/3.3; 248/906

(58) Field of Classification Search .................. 174/48, 174/49, 50, 53, 57, 58, 52.1, 59, 61, 63, 66, 174/67, 480, 481; 220/3.2, 3.3, 3.4, 3.5, 220/3.6, 3.7, 3.8, 4.02, 241, 242, 535, 536, 220/537, 538, 527; 248/906; D13/152, D13/177; 439/535, 536, 242, 241, 537, 538, 439/527
See application file for complete search history.

(56) References Cited

U.S. PATENT DOCUMENTS

| | | | | |
|---|---|---|---|---|
| 4,265,365 A | * | 5/1981 | Boteler | 174/53 |
| 4,635,168 A | * | 1/1987 | Crowley | 174/481 |
| 4,724,281 A | * | 2/1988 | Nix et al. | 174/53 |
| 4,988,832 A | * | 1/1991 | Shotey | 174/67 |
| 5,000,409 A | | 3/1991 | MacLeod et al. | |
| 5,275,366 A | | 1/1994 | Simmons | |
| 5,326,060 A | * | 7/1994 | Chubb et al. | 248/906 |
| 5,397,093 A | | 3/1995 | Chubb et al. | |
| D362,173 S | * | 9/1995 | Skitromo | D8/350 |
| 5,456,377 A | * | 10/1995 | Williams, Jr. | 220/3.8 |
| 5,773,760 A | * | 6/1998 | Stark et al. | 174/66 |
| 5,775,032 A | | 7/1998 | Lacy | |
| RE35,983 E | | 12/1998 | Crowley | |
| 5,920,033 A | * | 7/1999 | Bosse, Jr. | 174/481 |
| 6,028,268 A | * | 2/2000 | Stark et al. | 174/67 |
| 6,268,563 B1 | * | 7/2001 | Gretz | 174/53 |
| 6,355,882 B1 | * | 3/2002 | Gretz | 174/53 |
| 6,723,921 B1 | * | 4/2004 | Vagedes | 174/58 |
| 6,737,576 B1 | * | 5/2004 | Dinh | 174/50 |

* cited by examiner

*Primary Examiner*—Angel R. Estrada (57) ABSTRACT

A recessed electrical box including a flange having a rear surface formed to fit flush against siding. An inner cavity for accepting an electrical device extends well behind the flange. A removable cover is included for closing the inner cavity from the elements. The box is easily installed by forming a hole in the siding and sliding the box therein until the rear surface of the flange contacts the siding. The closeness of fit between the rear surface of the flange and the siding enables easy and rapid sealing between the box and the siding.

15 Claims, 11 Drawing Sheets

RECESSED OUTLET BOX RETROFIT SIDING CONSTRUCTION

This application is a Continuation-In-Part of U.S. patent application Ser. No. 11/102,392, filed Apr. 8, 2005 and still pending, which is a Continuation-In-Part of U.S. patent application Ser. No. 11/070,344, filed Mar. 2, 2005 and still pending, which is a Continuation-In-Part of U.S. patent application Ser. No. 11/009,116 filed Dec. 10, 2004 and still pending, which is a Continuation-In-Part of U.S. patent application Ser. No. 10/863,942 filed Jun. 9, 2004 now U.S. Pat. No. 6,956,171.

FIELD OF THE INVENTION

This invention relates to electrical junction boxes and specifically to a recessed outlet box that can be easily retrofitted to the exterior siding of a building for accommodating and protecting a duplex outlet or other electrical device therein.

BACKGROUND OF THE INVENTION

Siding is commonly installed as the outer finish on the exterior of houses or other buildings. After a house has been built with the siding secured thereto, homeowners quite often find it necessary and desirable to mount additional electrical devices, such as duplex outlets, switches, and timers, to provide additional electrical services.

In several patent applications sharing common ownership and inventorship with the present application, including U.S. patent application Ser. Nos. 10/863,942, 11/009,116, 11/070,344, and 11/102,392, various electrical boxes were presented which provided the advantage of recessing the electrical device well behind the outer wall of the building. When mounted as a retrofit to a wall having siding installed thereon, recessed electrical boxes of the aforementioned patent applications included a flat rear surface of the box in contact with the siding. Although this provided an adequate means of recessing an electrical device well within a wall, the seal between the electrical box and the siding was not optimized.

What is needed therefore is a recessed electrical box that is easily retrofitted onto siding and with an optimal sealing surface between the electrical box and the wall surface.

SUMMARY OF THE INVENTION

The invention is a recessed electrical box having a flange with a rear surface formed to fit flush against siding. An inner cavity for accepting an electrical device extends well behind the flange. A removable cover is included for closing the inner cavity from the elements. The box is easily installed by forming a hole in the siding and sliding the box therein until the rear surface of the flange contacts the siding. The closeness of fit between the rear surface of the flange and the siding enables easy and rapid sealing between the box and the siding.

OBJECTS AND ADVANTAGES

One advantage of the recessed electrical box of the present invention is that it recesses an electrical device well within the wall of a structure.

The recessed electrical box furthermore provides the advantage of a mated fit between the box and the siding without the use of a gasket.

Another advantage provided by the electrical box of the present invention is that it can be rapidly retrofitted to a finished structure having siding installed thereon.

A further advantage is that the recessed electrical box provides a first enclosure that positions the electrical device within the exterior wall, thereby shielding the electrical device from impacts, and a second enclosure for shielding the face of the electrical device from rain and other environmental elements.

Yet another advantage is that the recessed electrical box of the present invention replaces traditional three-piece assemblies including electrical box, siding cover, and bubble cover assembly with a single one-piece assembly.

A further advantage is that a wide front flange is provided for covering mistakes or to cover a poorly cut mounting hole for a retrofit application.

The current recessed electrical box further provides, when used to house a duplex outlet, an electrical box and a spacious protective enclosure for protecting the plug ends of electrical cords.

A further advantage is that the electrical box and flange are molded integrally in one piece, thereby reducing production costs.

The electrical box furthermore includes integral bosses with threaded bores for accepting fasteners from an electrical device.

The electrical box of the present invention also provides a removable cover for added convenience. The cover is also a while-in-use cover that enables passage of electrical cords therethrough to allow connection of plug ends of the cords while the cover is closed.

The electrical box of the present invention provides an electrical junction box that is UL-listed to meet the requirements of the electrical code. It has the advantage of working on most popular siding types.

These and other objects and advantages of the present invention will be better understood by reading the following description along with reference to the drawings.

TABLE OF NOMENCLATURE

The following is a listing of part numbers used in the drawings along with a brief description:

| Part Number | Description |
| --- | --- |
| 20 | recessed electrical box assembly |
| 22 | electrical box |
| 24 | spacer plate |
| 26 | cover member |
| 28 | sidewalls |
| 30 | flange |
| 32 | electrical device |
| 34 | faceplate |
| 36 | front surface of flange |
| 38 | back surface of flange |
| 40 | front surface of spacer plate |
| 42 | back surface of spacer plate |
| 44 | spacer plate for 5/16" siding |
| 46 | spacer plate for 5/8" siding |
| 48 | spacer plate for Dutch Lap siding |
| 50 | thin wall portion |
| 52 | peripheral wall of spacer plate |
| 54 | peripheral sidewall of cover member |
| 56 | bottom portion |
| 58 | U-shaped slot in cover member |
| 60 | aperture |
| 62 | ear |
| 63 | knockout |
| 64 | post |
| 66 | interior mounting surface |
| 68 | outer surface of building |
| 70 | securement arrangement |
| 72 | aperture in flange |
| 74 | fastener |
| 76 | siding |
| 78 | boss |
| 80 | threaded bore |
| 81 | device fastener |
| 82 | forward extending peripheral wall of electrical box |
| 84 | U-shaped slot in electrical box |
| 86 | bottom portion of peripheral wall of electrical box |
| 88 | circular cord opening |
| 90 | front edge of electrical box |
| 94 | inner surface |
| 96 | slope of inner surface |
| 97 | hole in siding and substrate |
| 98 | substrate |
| 100 | recessed electrical box assembly, 2nd embodiment |
| 102 | electrical box |
| 104 | rear peripheral wall |
| 106 | back surface of flange |
| 108 | flange |
| 110 | rear surface of rear peripheral wall |

-continued

| Part Number | Description |
| --- | --- |
| X | distance of sidewall from back surface of flange |
| Y | distance of interior mounting surface from back surface of flange |
| Z | amount of downward slope on inner surface of bottom sidewall |

DETAILED DESCRIPTION OF THE INVENTION

Figure 1:
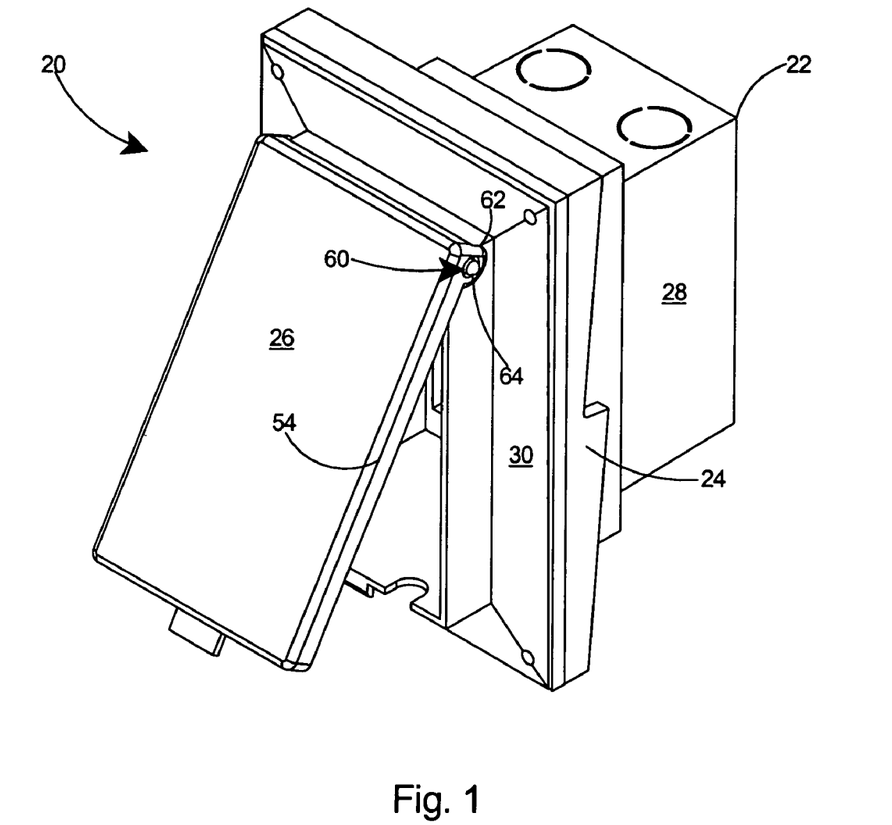
FIG. 1 is a perspective view of a first and preferred embodiment of a recessed electrical box including a cover member for retrofit siding construction according to the present invention.

FIG. 1 depicts a preferred embodiment of a recessed electrical box assembly 20 according to the present invention. The recessed electrical box assembly 20 includes a box member or electrical box 22, a spacer plate 24, and a cover member 26. The electrical box 22 includes sidewalls 28 and a peripheral flange 30 extending outwardly from the sidewalls 28.

Figure 7:
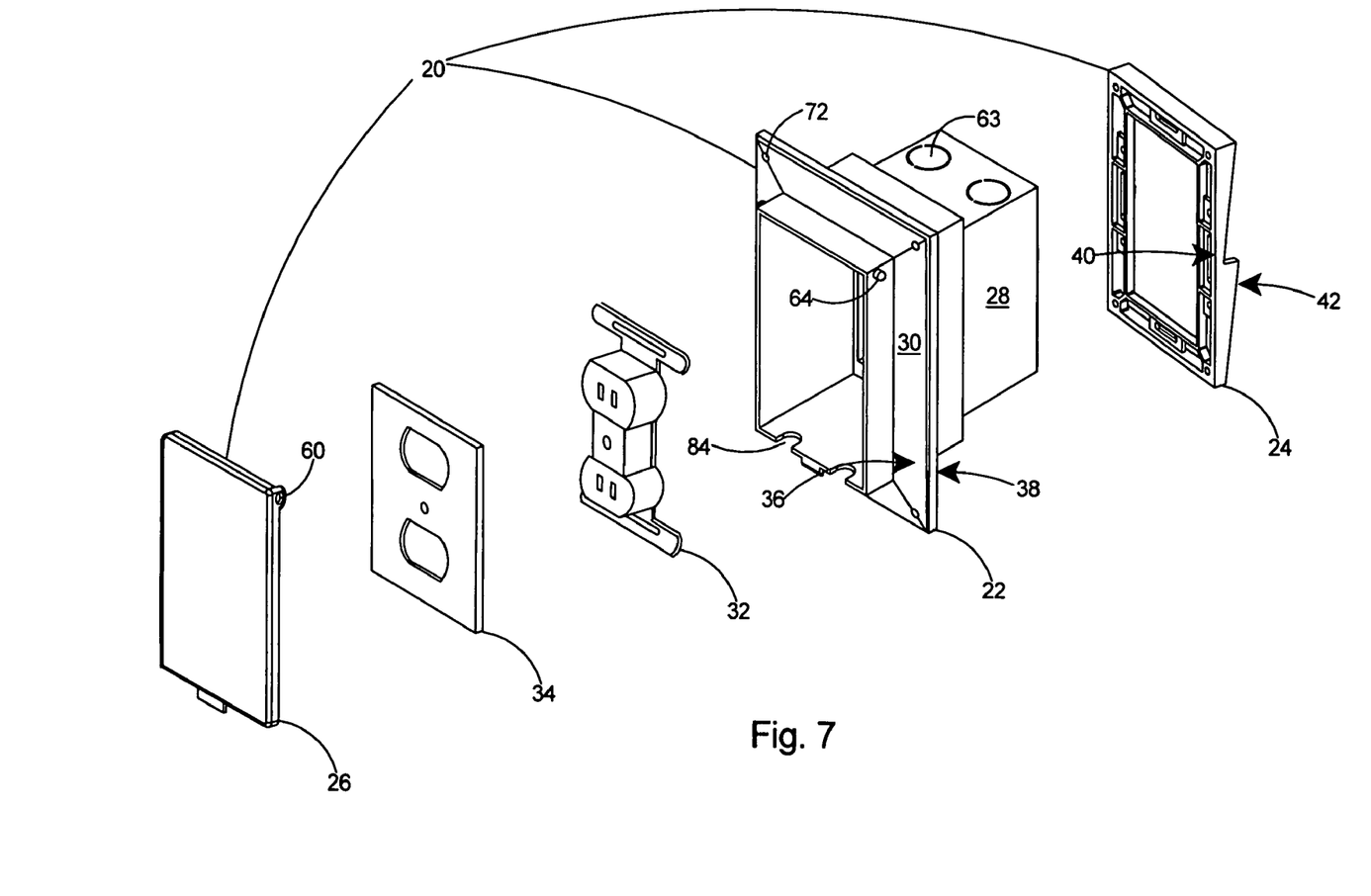
FIG. 7 is an exploded perspective view of a recessed electrical box, spacer member, cover member, electrical outlet, and faceplate in alignment prior to securement to a wall having siding thereon.

FIG. 7 depicts the electrical box assembly 20 with the electrical box 22, spacer plate 24, and cover member 26 exploded away from each other. The electrical box assembly 20 is used for mounting an electrical device 32, such as the duplex outlet shown, substantially behind the outer surface of a building. The recessed electrical box assembly 20 accepts most single gang wiring devices, including ground fault receptacles, and standard indoor wall faceplates 34, such as the one depicted in FIG. 7. The flange 30 includes a front surface 36 and a back surface 38.

Figure 2:
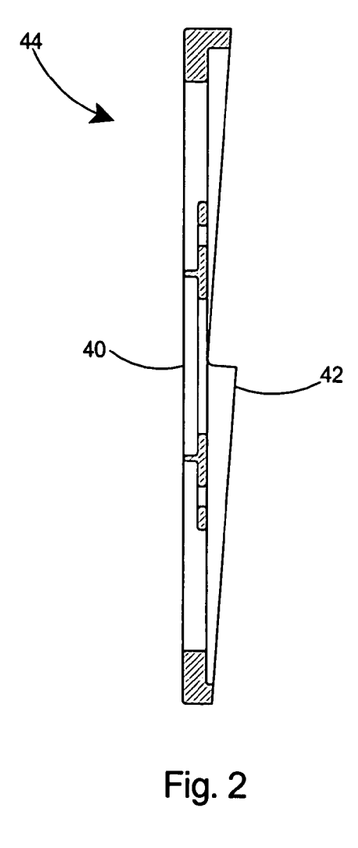
FIG. 2 is a sectional view of a spacer plate member used to fit the recessed electrical box to $5/16''$ lap siding.
Figure 3:
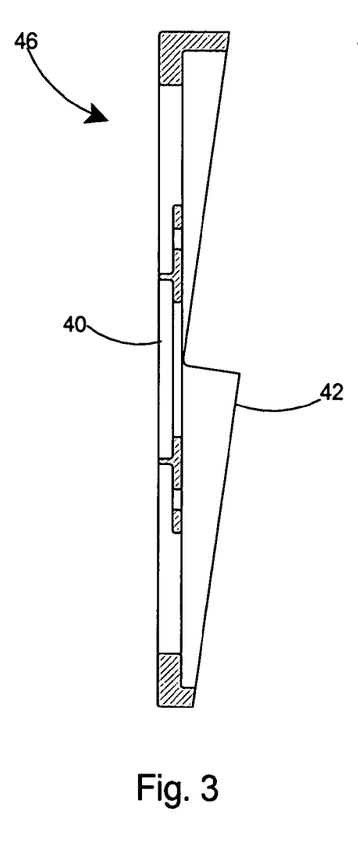
FIG. 3 is a sectional view of a spacer plate member used to fit the recessed electrical box to $5/8''$ lap siding.
Figure 4:
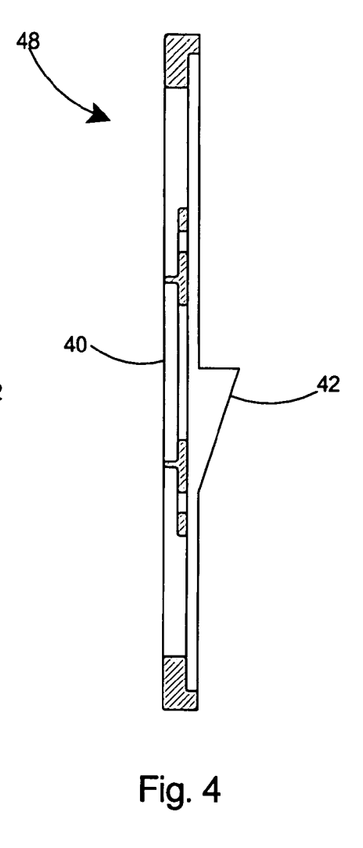
FIG. 4 is a sectional view of a spacer plate member used to fit the recessed electrical box to Dutch lap siding.

With reference to FIGS. 2–4, several embodiments of spacer plates are shown. Each spacer plate includes a front surface 40 and a back surface 42. The back surface 42 of the spacer plate includes a profile shaped to match the profile of the siding it will be used with. Siding for houses and other structures typically is manufactured in several standard sizes. Some of the most popular siding types include ¼-inch lap siding, 5/16-inch lap siding, ½-inch lap siding, 5/8-inch lap siding, and Dutch Lap siding. The spacer plates in the present invention are therefore manufactured in several embodiments in order that the back surface 42 of the spacer plate will substantially match the profile of the siding it will be fitted to. The spacer plates in FIGS. 2–4 therefore depict a spacer plate 44 (see FIG. 2) for use with 5/16" lap siding, a spacer plate 46 (see FIG. 3) for use with 5/8" lap siding, and a spacer plate 48 (see FIG. 4) for use with Dutch Lap siding.

Figure 5:
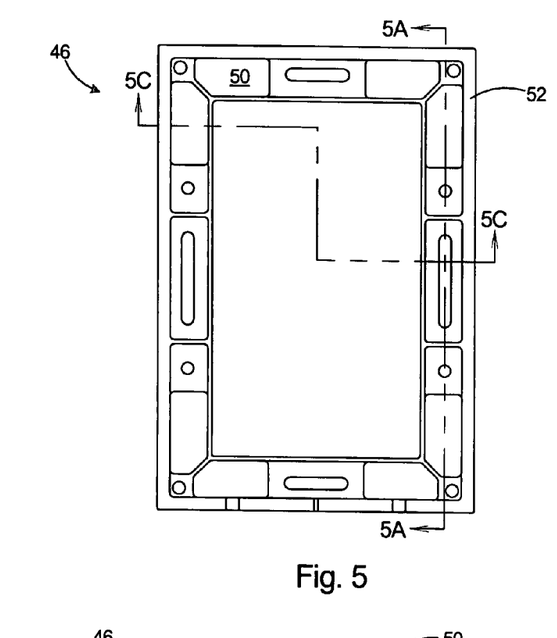
FIG. 5 is a front view of a spacer plate used for fitting the recessed electrical box to $5/16''$ lap siding.
Figure 5A:
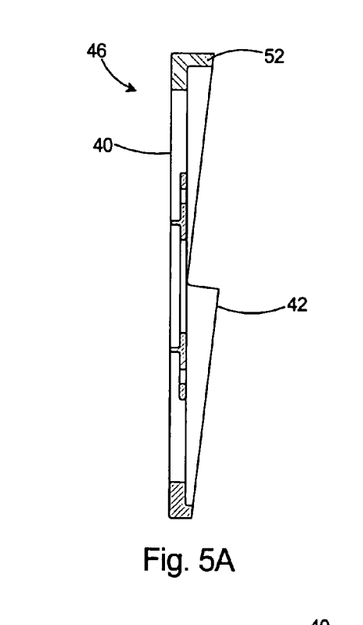
FIG. 5A is a sectional view of the spacer plate of FIG. 5 taken along line 5A—5A.
Figure 5B:
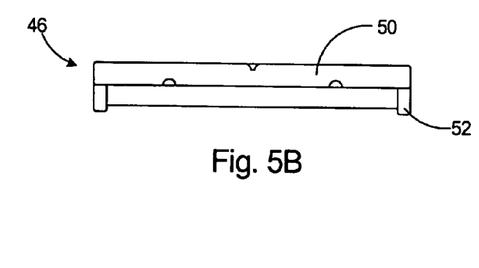
FIG. 5B is an end view of the spacer plate of FIG. 5.
Figure 5C:
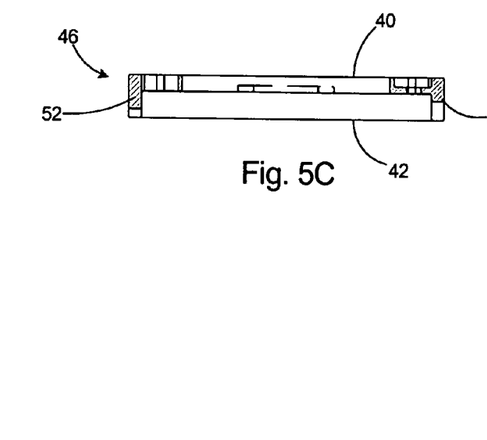
FIG. 5C is a sectional view of the spacer plate of FIG. 5 taken along line 5C—5C.

Referring to FIGS. 5–5C, to save on material cost, the spacer plate 46 includes a thin wall portion 50 and a peripheral wall 52 which forms the siding profile on the back surface 42.

Figure 10:
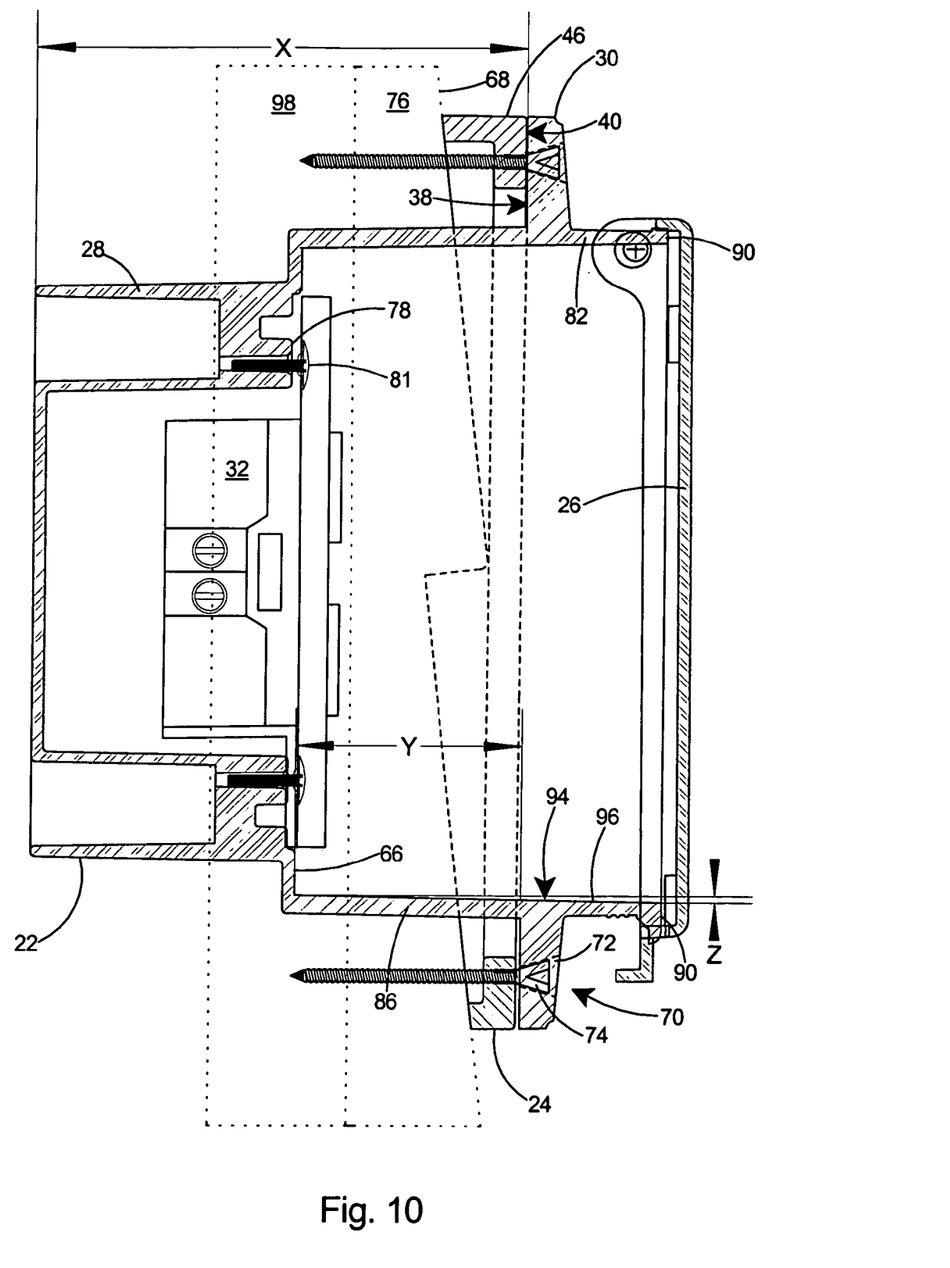
FIG. 10 is a sectional view of the electrical box assembly taken along line 10—10 of FIG. 9 and secured to siding on a structure.

With reference to FIG. 10, the front surface 40 of the spacer plate 46 includes a profile to match the profile of the back of the flange 30, which preferably is flat to obtain a good seal between the back surface 38 of the flange 30 and the front surface 40 of the spacer plate 46 when they are secured together. It is preferable that the back surface 38 of the flange 30 joins the front surface 40 of the spacer plate 46 in a flush fit that forms a seal between the flange 30 and spacer plate 46.

Figure 6:
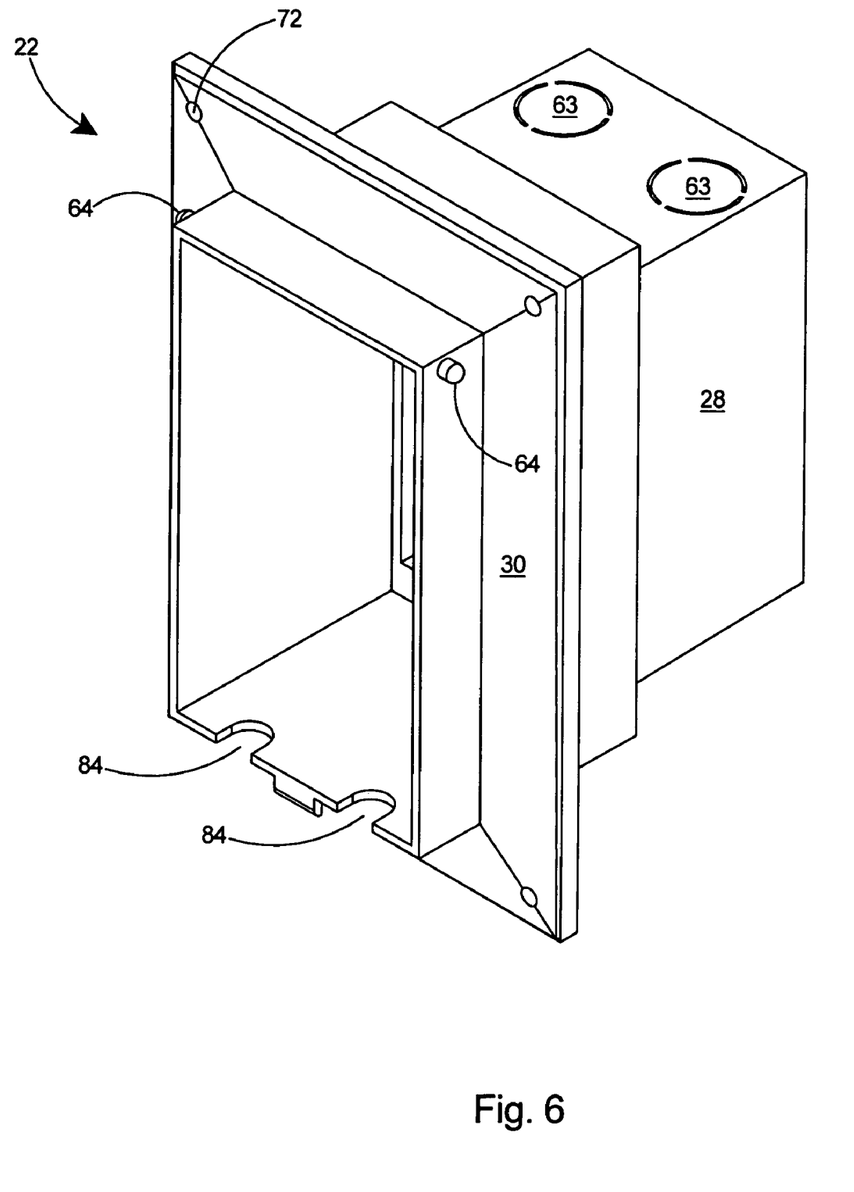
FIG. 6 is a perspective view of the recessed electrical box of FIG. 1 without the cover member.
Figure 8:
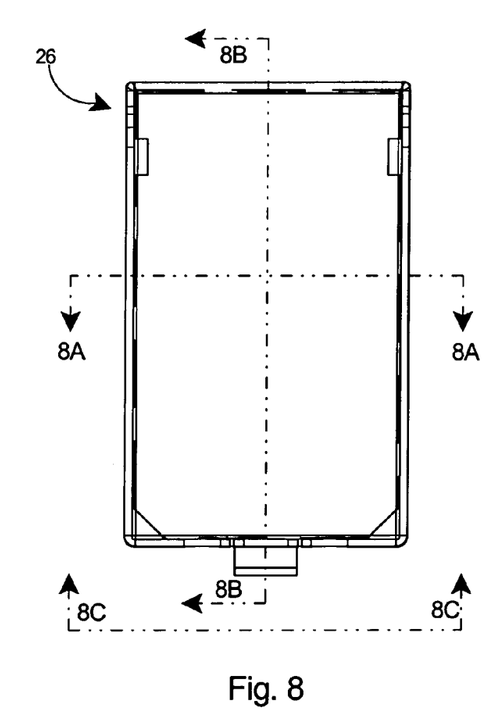
FIG. 8 is a front elevation view of a cover member that forms a portion of the recessed electrical box of the present invention.
Figure 8A:
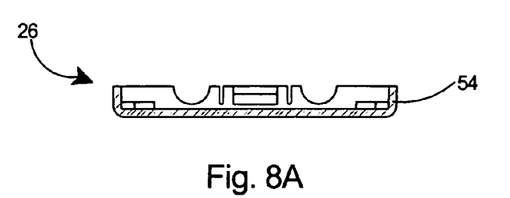
FIG. 8A is a sectional view of the cover member taken along line 8A—8A of FIG. 8.
Figure 8B:
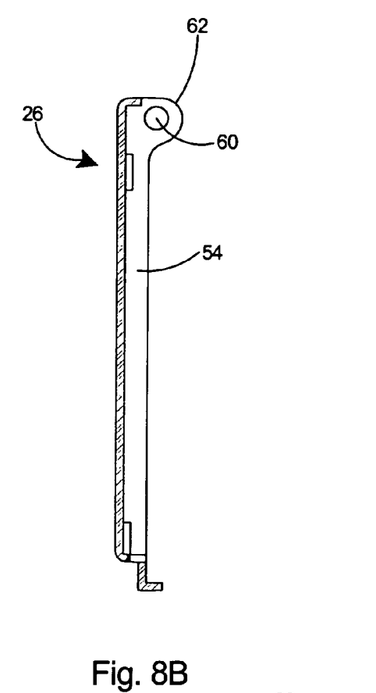
FIG. 8B is a sectional view of the cover member taken along line 8B—8B of FIG. 8.
Figure 8C:
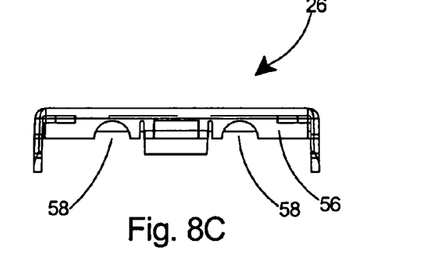
FIG. 8C is a bottom view of the cover member taken along line 8C—8C of FIG. 8.

As shown in FIGS. 8–8C, the cover member 26 is removable and includes a peripheral sidewall 54 thereon. A bottom portion 56 of the peripheral sidewall 54 includes U-shaped slots 58 (see FIG. 8C). Apertures 60 are provided in ears 62 extending from the peripheral sidewall 54 of the cover member 26 for securing the cover member 26 pivotally to the electrical box. As shown in FIG. 6, posts 64 are provided on the electrical box 22. Removable wall sections or knockouts 63 are provided in the sidewalls 28 of the recessed electrical box 22.

As shown in FIG. 1, the cover member 26 is pivotally connected to the box member 22 by the posts 64 extending through the apertures 60 in the peripheral sidewall 54 of the cover member 26. The cover member 26 is preferably constructed of a flexible material, such as plastic, and the ears 62 of the cover member 26 can be easily biased outwards from their normal position and the ears 62 slipped over the posts 64 until the posts snap through the apertures 60.

Reference is made to the sectional view of the electrical box 22 and spacer plate 24 in FIG. 10. The sidewalls 28 extend substantially beyond the back surface 38 of the flange 30 (see distance X in FIG. 10). It is preferable that the sidewalls 28 of the electrical box 22 extend at least 2.0 inches, as represented by distance X, beyond the back surface 38 of the flange 30 to enable the sidewalls 28 to be recessed substantially behind the face of a building when the recessed electrical box assembly of the present invention is secured thereto.

As further shown in FIG. 10, the electrical box 22 includes an interior mounting surface 66 to allow for the mounting of an electrical device 32 within the box member 22. Preferably, the interior mounting surface 66 is located substantially behind (see distance Y) the back surface 38 of the flange 30. Positioning the interior mounting surface 66 substantially behind the back surface 38 of the flange 30 ensures that the electrical device 32 secured within the box 22 will be situated well within the outer surface 68 of the siding 76, thereby protecting the electrical device 32 therein from damage by accidental impacts of lawn power equipment and the like. It is preferable that the interior mounting surface 66 be located at least 1.0 inch behind the back surface 38 of the flange 30 to provide superior protection to the electrical device 32 secured therein.

Figure 9:
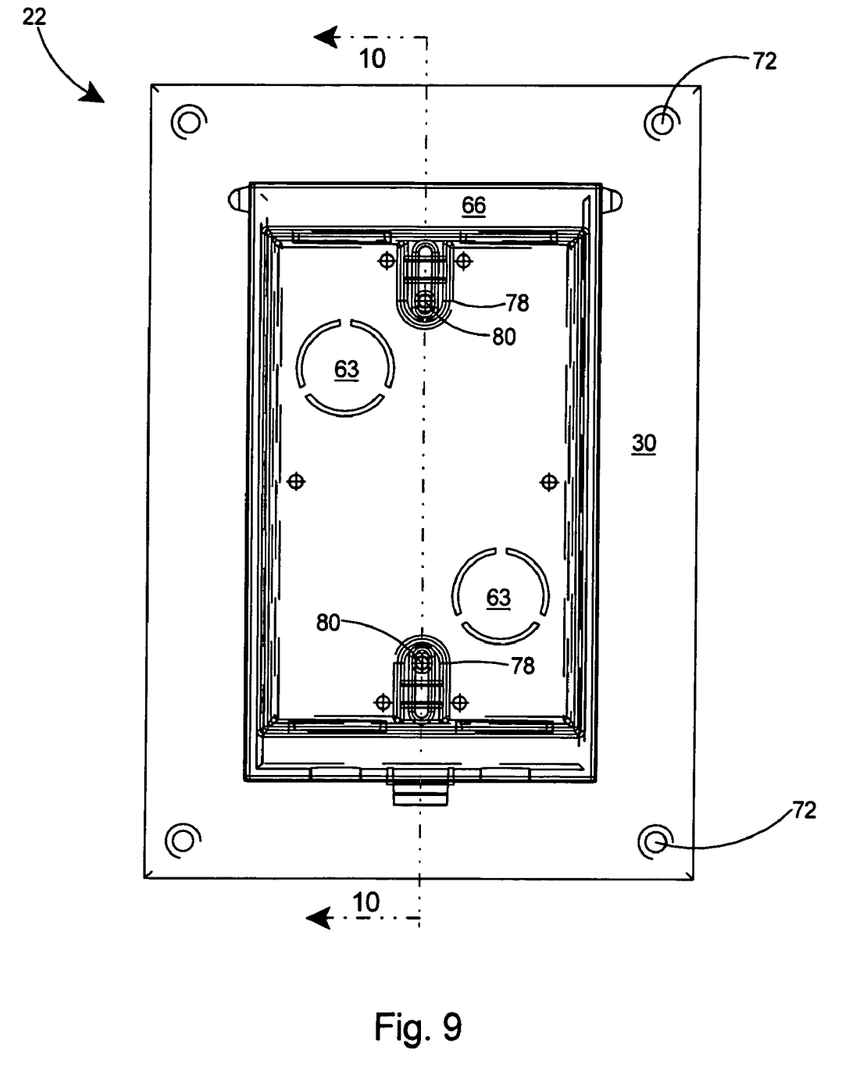
FIG. 9 is a front view of the electrical box assembly of FIG. 1 without the cover.

Referring to FIG. 10, the electrical box 22 further includes a securement arrangement 70 in the flange 30 including apertures 72 in the flange 30 and fasteners 74 for installing through the apertures 72 in the flange 30 and into the siding 76. As shown in FIG. 9, there are preferably four apertures 72 in the flange 30. The electrical box 22 further includes bosses 78 at the interior mounting surface 66. The bosses 78 include threaded bores 80 for receipt of device fasteners 81 (see FIG. 10) for securing the electrical device 32 thereto.

Figure 11:
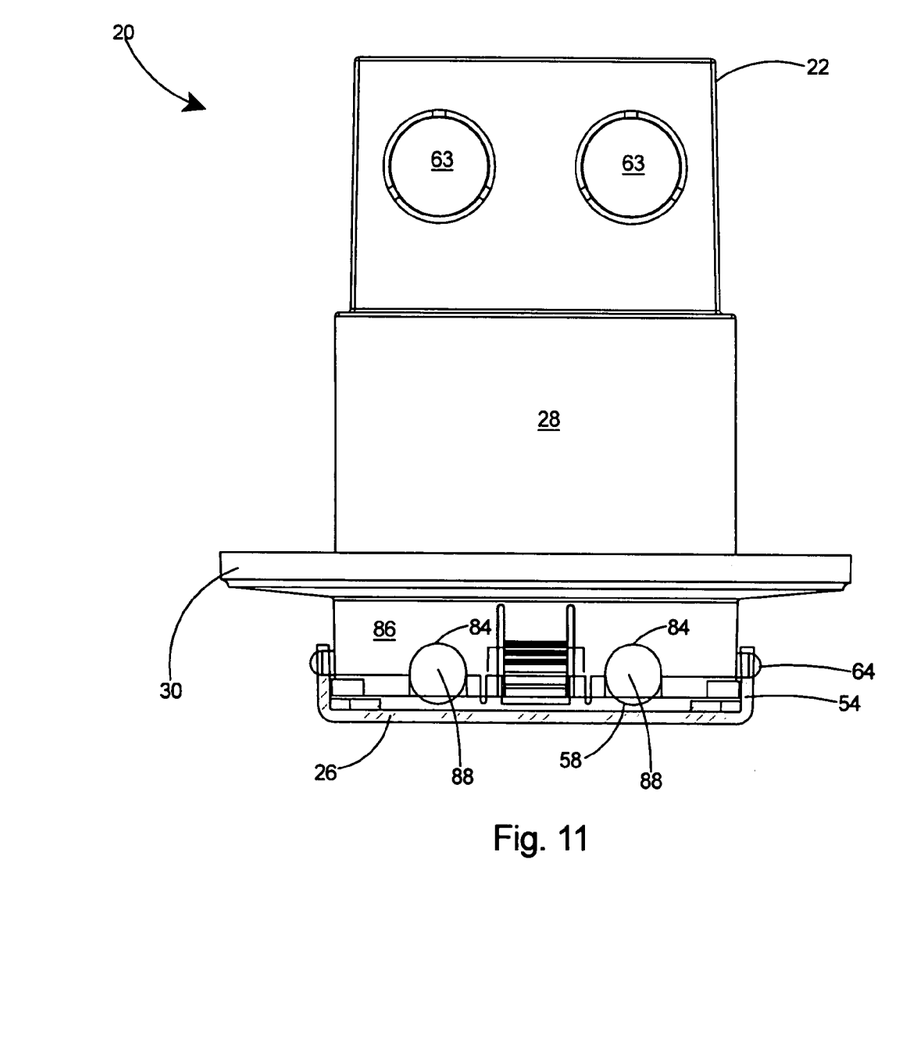
FIG. 11 is a bottom view of the electrical box assembly of FIG. 1 with the cover member in a closed position.

With reference to FIG. 11, the electrical box 22 further includes a forward extending peripheral wall 82 extending forward from the flange 30. U-shaped slots 84 are provided in the bottom portion 86 of the forward extending peripheral wall 82. When the cover member 26 is closed upon the electrical box 22, as shown in FIG. 11, the U-shaped slots 58 in the cover member 26 are in alignment with the U-shaped slots 84 in the forward extending peripheral wall 82 thereby creating circular electrical cord openings 88 therein. Electrical cords (not shown) can therefore remain secured to the electrical device within the electrical box while the cover is closed, thereby protecting the electrical device and plug ends of the electrical cords against rain and other weather elements.

Referring to FIG. 10, the electrical box 22 further includes a front edge 90 at the forward end of the forward extending peripheral wall 82. The bottom portion 86 of the sidewalls 28 of the electrical box 22 further includes an inner surface 94. The inner surface 94 includes a slope 96, designated by distance Z in FIG. 10, downwards on the inner surface 94 of the bottom portion 86 of the sidewall 28 from the interior mounting surface 66 to the front edge 90 of the box member 22. This downward slope 96 is preferable to enable any rain or condensation that enters the electrical box assembly 20 to run downwards toward the front edge 90 and thence out of the box 22. Preferably, the slope 96 from the interior mounting surface 66 to the front edge 90 is at least 0.020 inch.

With reference to FIG. 6, preferably the electrical box 22 and the flange 30 of the present invention are formed in one piece by injection molding of plastic. Preferably, the plastic is selected from the group including polycarbonate, polyvinyl chloride, polyethylene, or polypropylene.

Referring to FIG. 8, the cover member 26 is also preferably formed in one piece by injection molding of plastic. The material of construction of the cover member 26 includes plastic selected from the group including polycarbonate, polyvinyl chloride, polyethylene, or polypropylene. A most preferred material of construction of the cover member 26 is polycarbonate to impart high impact resistance to the cover member 26. As the cover member 26 is exposed to impacts and functions to protect the electrical device secured therein, it is preferred that the cover member has high impact resistance.

Reference is made to FIG. 10 for operation of the recessed electrical box assembly 20 of the present invention. The recessed electrical box assembly 20 is used to retrofit an existing building having siding 76 thereon with an electrical device 32 recessed inward from the outer surface 68 of the siding 76. The recessed electrical box assembly 20 is installed by first cutting a hole 97 in the siding 76 and the substrate 98, the hole 97 being large enough to accept the sidewalls 28 of the electrical box portion 22 of the recessed electrical box assembly 20. The electrical box 22 is then inserted into the hole 97 until the back surface 42 of the spacer plate 46 is flush against the siding 76 and the back surface 38 of the flange 30 joins the front surface 40 of the spacer plate 46 in a flush fit. Fasteners 74 are then inserted through the apertures 72 in the flange 30 and tightened into the siding 76 and the substrate 98 to secure the recessed electrical box assembly 20 to the siding 76 and the substrate 98. If the electrical box assembly 20 is installed in an area that will be exposed to the weather, caulking can be applied at the juncture of the electrical box 22 and the siding 76.

Figure 12:
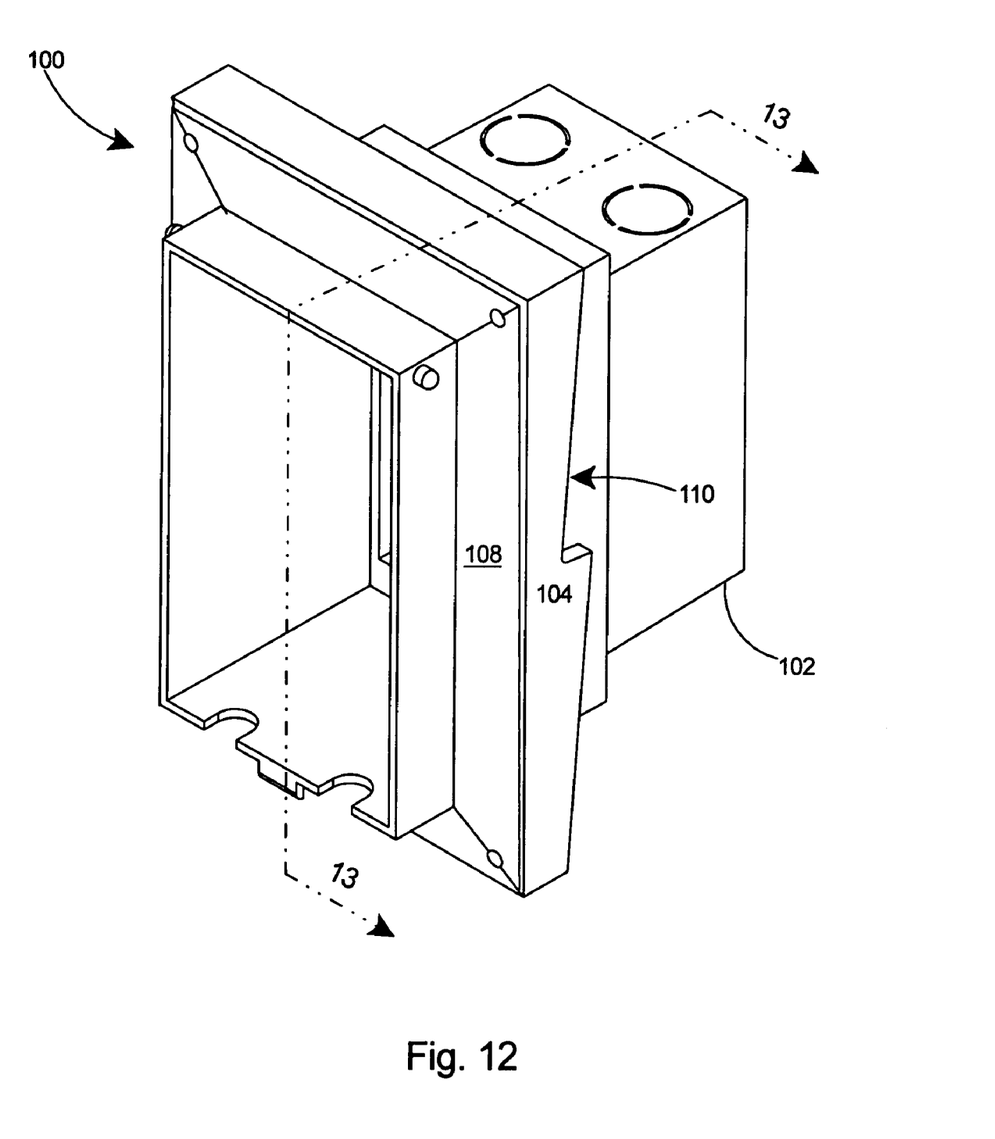
FIG. 12 is a perspective view of a second embodiment of the electrical box in which the back side of the flange has a profile to substantially match the profile of siding.
Figure 13:
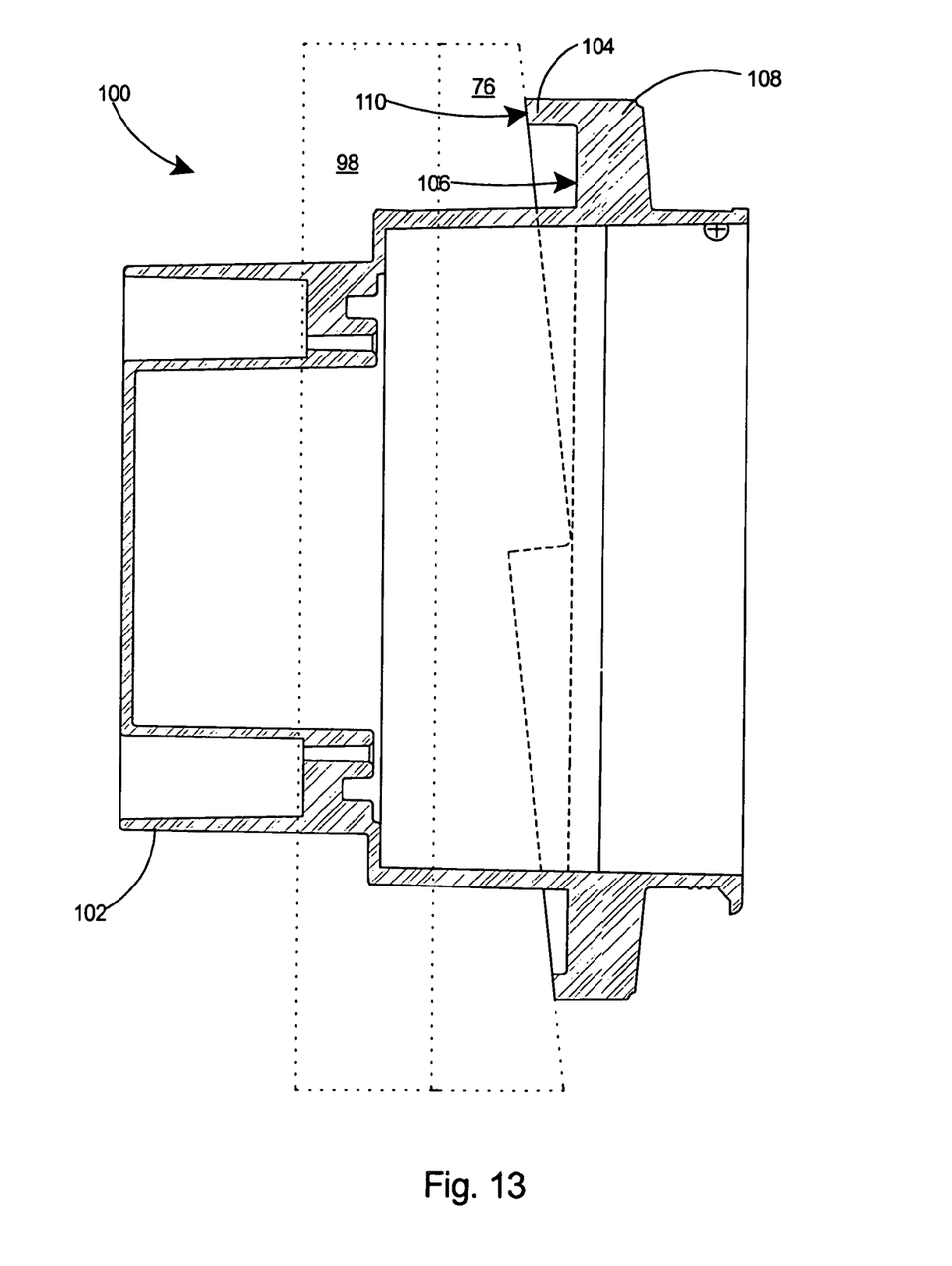
FIG. 13 is a sectional view of the electrical box assembly taken along line 13—13 of FIG. 12.

A second embodiment of the recessed electrical box assembly 100 is shown in FIGS. 12 and 13. In this embodiment of the recessed electrical box, the electrical box 102 is provided in one piece, with a rear peripheral wall 104 extending from the back surface 106 (see FIG. 13) of the flange 108 and the rear surface 110 of the rear peripheral wall 104 having a profile to match the profile of the siding it will be secured to. The advantage of this embodiment of the recessed electrical box assembly 100 is that the spacer plate of the first embodiment is eliminated. With reference to FIG. 10, in comparison with the second embodiment, the advantage of the first embodiment of the recessed electrical box assembly 20 is that it can be used for any particular style of siding by just providing a spacer plate 24 having the appropriate profile to match the profile of the siding on the structure. The first embodiment of the recessed electrical box assembly 20 therefore reduces stocking and inventory requirements as one electrical box 22 can be stocked and used with virtually any style of siding. Various embodiments of the spacer plate 44, 46, or 48 such as shown in FIGS. 2–4, would be stocked and selected by the installer for the particular installation based upon the type of existing siding on the structure.

Having thus described the invention with reference to a preferred embodiment, it is to be understood that the invention is not so limited by the description herein but is defined as follows by the appended claims.

What is claimed is:

1. An electrical box for securing an electrical device to a wall having siding thereon comprising:
    a box member including sidewalls, a front edge, and a flange integral with said box member and extending outwardly from said sidewalls;
    a back surface on said flange;
    said flange located rearward of said front edge of said box member;
    said back surface on said flange adapted to contact said siding and including a non-planar profile shaped to substantially match the profile of said siding;
    an interior mounting surface in said electrical box for securing said electrical device substantially within said wall;
    said sidewalls of said box member including a bottom sidewall having an inner surface; and
    a downward slope on said inner surface of said bottom sidewall from said interior mounting surface to said front edge of said box member.

2. The electrical box of claim 1 wherein
    said sidewalls extend substantially behind said back surface of said flange; and
    said interior mounting surface is located substantially behind said back surface of said flange.

3. The electrical box of claim 1 including
    a removable cover member having a peripheral sidewall thereon;
    posts on said box member;
    apertures in said peripheral sidewall of said cover member; and
    said cover member pivotally connected to said box member by said posts extending through said apertures in said peripheral sidewall.

4. The electrical box of claim 3 including
    a forward extending peripheral wall extending from said flange;
    U-shaped slots in said cover member;
    U-shaped slots in said forward extending peripheral wall; and
    said U-shaped slots in said cover member in alignment with said U-shaped slots in said forward extending peripheral wall such that said cover member when closed upon said box member creates circular cord openings therein.

5. The electrical box of claim 1 wherein said slope from said interior mounting surface to said front edge is at least 0.020 inch.

6. The electrical box of claim 1 including
    bosses at said interior mounting surface; and
    bores in said bosses for receipt of fasteners for securing said electrical device thereto.

7. The electrical box of claim 1 wherein said interior mounting surface is located at least 1.0 inch behind said back surface of said flange.

8. The electrical box of claim 1 wherein said sidewalls extend at least 2.0 inches beyond said back surface of said flange.

9. An electrical box for securing an electrical device to a structure having siding thereon comprising:
    a box member including sidewalls, a front edge, and a flange integral with said box member and extending outwardly from said sidewalls;
    a back surface on said flange;
    said flange located rearward of said front edge of said box member;
    a spacer plate having a front surface and a back surface;
    said back surface of said flange joining said front surface of said spacer plate in a flush fit;
    said back surface of said spacer plate adapted to contact said siding and including a non-planar profile shaped to match the profile of said siding;
    said sidewalls extending substantially behind said back surface of said flange;
    an interior mounting surface for mounting of an electrical device within said box member;
    said interior mounting surface located substantially behind said back surface of said flange;
    said sidewalls of said box member including a bottom sidewall having an inner surface; and
    a downward slope on said inner surface of said bottom sidewall from said interior mounting surface to said front edge of said box member.

10. The electrical box of claim 9 including
    a removable cover member having a peripheral sidewall thereon;
    posts on said box member;
    apertures in said peripheral sidewall of said cover member; and
    said cover member pivotally connected to said box member by said posts extending through said apertures in said peripheral sidewall.

11. The electrical box of claim 10 including
    a forward extending peripheral wall extending from said flange;
    U-shaped slots in said cover member;
    U-shaped slots in said forward extending peripheral wall; and
    said U-shaped slots in said cover member in alignment with said U-shaped slots in said forward extending peripheral wall such that said cover member when closed upon said box member creates circular cord openings therein.

12. The electrical box of claim 9 including
    bosses at said interior mounting surface; and
    threaded bores in said bosses for receipt of device fasteners for securing said electrical device thereto.

13. The electrical box of claim 9 wherein said electrical box and said flange are formed in one piece by injection molding of plastic.

14. The electrical box of claim 13 wherein said plastic is selected from the group including polycarbonate, polyvinyl chloride, polyethylene, or polypropylene.

15. A method of retrofitting an electrical box to a structure having substrate and siding thereon, including:
    providing an electrical box including a box member having sidewalls, a front edge, and a flange integral with said box member and extending outwardly from said sidewalls, a back surface on said flange, said flange located rearward of said front edge of said box member, apertures in said flange, a spacer plate having a front surface and a back surface, a non-planar profile on said back surface of said spacer plate shaped to match the profile of said siding, said sidewalls extending substantially beyond said back surface of said flange; an interior mounting surface for mounting of an electrical device within said box member, and said interior mounting surface located substantially behind said back surface of said flange, said sidewalls of said box member including a bottom sidewall having an inner surface, and said inner surface of said bottom sidewall including a downward slope from said interior mounting surface to said front edge of said box member;
  a) cutting a hole in said siding and said substrate;
  b) inserting said electrical box into said hole until said back surface of said spacer plate is flush against said siding and said back surface of said flange joins said front surface of said spacer plate in a flush fit;
  c) inserting fasteners through said apertures in said flange; and
  tightening said fasteners into said siding and said substrate to secure said electrical box to said siding and said substrate.

* * * * *